(12) United States Patent
Newman et al.

(10) Patent No.: US 6,434,950 B2
(45) Date of Patent: *Aug. 20, 2002

(54) MODULAR APPARATUS FOR COOLING AND FREEZING OF A FOOD PRODUCT ON A MOVING SUBSTRATE

(75) Inventors: Michael D. Newman, Hillsborough, NJ (US); Stephen A. McCormick, Warrington, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/757,972

(22) Filed: Jan. 10, 2001

Related U.S. Application Data (63) Continuation-in-part of application No. 09/483,963, filed on Jan. 18, 2000.

(51) Int. Cl.[7] .................. F25D 13/06; F25D 17/02; F25D 25/04
(52) U.S. Cl. .................. 62/63; 62/64; 62/374; 62/380
(58) Field of Search .................. 62/63, 64, 417, 62/418, 404, 378, 374, 380

(56) References Cited

U.S. PATENT DOCUMENTS

| | | | | |
|---|---|---|---|---|
| 2,180,071 A | * | 11/1939 | Smith | 62/418 |
| 3,864,931 A | * | 2/1975 | Guttinger | 62/63 |
| 4,100,760 A | * | 7/1978 | Cheney | 62/57 |
| 4,177,647 A | * | 12/1979 | Overbye | 62/63 |
| 4,783,972 A | | 11/1988 | Tyree et al. | |
| 5,247,801 A | * | 9/1993 | Jaxmar et al. | 62/63 |
| 5,408,921 A | | 4/1995 | Persson et al. | |
| 5,444,985 A | * | 8/1995 | Lang et al. | 62/63 |
| 5,881,562 A | * | 3/1999 | Cloarec | 62/63 |
| 6,263,680 B1 | * | 7/2001 | Newman et al. | 62/63 |

FOREIGN PATENT DOCUMENTS

EP 0 744 583 A2 11/1996

OTHER PUBLICATIONS

European Search Report.

* cited by examiner

Primary Examiner—William C. Doerrler
(74) Attorney, Agent, or Firm—Joshua L. Cohen; Salvatore P. Pace (57) ABSTRACT

An apparatus for the chilling or freezing of items, particularly food items includes an entrance module, an exit module and may include one or more intermediate modules. Each module includes a portion of a belt for conveying items and a motor driven impeller for circulating a stream of cryogenic gas around the items. The velocity of the stream of cryogenic gas is increased through the use of one or more impingers creating impingement jets above and below the belt. The impinger may be a plate having a series of holes or it may be a series of channels. The impinger effects the rate of heat transfer from the cryogen to the items. A sprayer for spraying liquid cryogen into the impingement jets provides an immediate freezing of the surface of an item. A pneumatically actuated ball valve is used to vibrate the impingers to remove snow and ice on the impingers.

29 Claims, 6 Drawing Sheets

MODULAR APPARATUS FOR COOLING AND FREEZING OF A FOOD PRODUCT ON A MOVING SUBSTRATE

CROSS-REFERENCE TO RELATED APPLICATIONS

This application is a continuation-in-part of Application Ser. No. 09/483,963, filed Jan. 18, 2000 which is currently pending.

BACKGROUND OF THE INVENTION

This invention relates to an improved method and device for cooling and freezing a food or other item which is carried through the device on a belt or other moving substrate. More specifically, this invention relates to a device wherein a liquid and gas-phase cryogens are used to cool and/or freeze food items that are moved through the device on a belt. The transfer of heat from the food item to the cryogen is maximized through the use of a process in which liquid cryogen is sprayed into a stream of gaseous cryogen which is circulated around the food item while also using a novel impingement plate to create a stream of cryogen. A novel design of the device increases the heat transferred from the food items to the cryogen.

Commercial freezers typically rely on the transfer of heat from a food product that is to be chilled or frozen by using a fan or blower which is situated near a conveyer upon which the food is being carried. The food product entering the freezer has a boundary layer of air surrounding it which insulates the food product in the surrounding atmosphere. Traditional freezers have employed blowers that generate currents of cooling vapor in many directions so that a significant portion of the vapor does not contact the food product in a perpendicular direction. Under these conditions the vapor which does contact the food product often does not possess sufficient energy to substantially reduce the boundary layer around the surface of the food product. There is, therefore, a need to generate directed jets of cooling vapor so as to disturb the boundary layer.

U.S. Pat. No. 4,479,776 to Smith discloses an apparatus using a plurality of vertical tubes to provide a unidirectional air flow toward the food product.

U.S. Pat. No. 4,626,661 to Henke discloses the use of a plurality of nozzles along the pathway of a food product for delivering discrete jets of unidirectional cooling air.

The use of tubes or slots to direct air in a cooling or freezing device has met with only limited success due to the build-up of condensation or ice in the tubes or slots which quickly reduces the efficacy of the devices.

U.S. Pat. No. 5,487,908 to Appolonia et al. discloses a method and device for heating or cooling a food product on a moving substrate in which a continuous channel traversing at least a major portion of the width of the moving substrate converts multi-directional flow into unidirectional flow. Such a device suffers, however, from having such an increased rate of flow that the food products become entrained in the flow and controlled processing of the food item through the device becomes difficult.

Increasing the velocity of the stream of cryogenic vapor which impinges the food item will increase the average heat transfer coefficient in a linear manner. At a certain point, however, unless the impingement stream is carefully controlled the velocity may also be sufficient to damage the food product or to carry the food product off the conveyor and into undesirable locations elsewhere in the freezer.

Overall heat transfer rates are dependent on local heat transfer coefficients, i.e., the amount of heat transferred from the food products to the cryogen is dependent on the rate of heat transfer locally between the cryogen and the food item. Local heat transfer rate can be changed by controlling the distance from the source of impingement jets to the food product, the velocity of the impingement jets, the turbulence in the jet and the efficiency of the flow of cryogen.

A need remains, therefore, for a device which can rapidly chill and/or freeze a food item while reducing the amount of cryogen needed by extracting the maximum cooling effect from a given amount of cryogen. The device must also be capable of transporting food from an inlet to an outlet without damaging the food product. Additionally, the device must be able to control the throughput of food items and must be resistant to the freezing and plugging of internal components by snow and ice build-up.

SUMMARY OF THE INVENTION

Accordingly, the present invention increases the amount of heat transferred from an item, particularly a food product, to a cryogen by generating impingement jets capable of breaking through the thermal boundary layer of the product, but which are not capable of damaging the product.

Furthermore, the present invention provides a jet of cryogenic gas to impinge the surface food products without causing the food products to become entrained in the impingement jet.

Furthermore, the present invention provides an efficient path for recirculation of cryogenic gases back to the blower means so as to increase the efficiency of the freezer.

Another advantage of the present invention is to provide a modular design which can be adapted to provide a plurality of solutions for food processing requirements.

A further advantage of the present invention is that the connection of the modules provides for continual impingement of cryogenic gas on food items from their entrance into the freezer apparatus until exiting.

An additional advantage of the present invention is the reduction in the dehydration of the food items which is accomplished through the immediate freezing of the exterior of the product upon entry into the apparatus.

A still further advantage of the present invention is the consistent cooling and or freezing of items across the width of the belt upon which the food items travel.

In one embodiment of the present invention a modular food chilling and/or freezing apparatus is provided which comprises an entrance module, an exit module and one or more intermediate modules. Each module contains a section of belt upon which food is transported. Each module contains an impinger which enables high velocity jets of cryogenic gas to impinge the upper and lower surfaces of the food items. The impinger may be a plate having a specific configuration of rounded or chamfered holes. In another embodiment a series of channels is used. A sprayer is provided in one or more modules in order to entrain droplets of liquid cryogen in the jets of cryogenic gas.

In an embodiment of the present invention the interface between modules includes a baffle for controlling the pressure differential and transfer of cryogen between modules.

In a further embodiment a pneumatically actuated ball valve vibrator modules used to remove the build-up of snow and ice from impingement plates.

In a still further embodiment of the present invention a hydraulic system is used to provide easy access to the interior of the apparatus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention but are not intended to limit the invention as encompassed by the claims forming part of the application.

DESCRIPTION OF THE INVENTION

The present invention is directed to an apparatus for cooling and/or freezing food products in which a food item is conveyed on a belt or other substrate into a chamber in which the food product is cooled or frozen due to its contact with gas-phase cryogens such as nitrogen or carbon dioxide.

The heat transfer resulting in the cooling or freezing of the food products results from the impingement of a stream of cryogenic vapor on the food item. Additional heat transfer may also be achieved by spraying liquid or solid cryogen into the impingement jet streams of cryogenic vapor.

Figure 1:
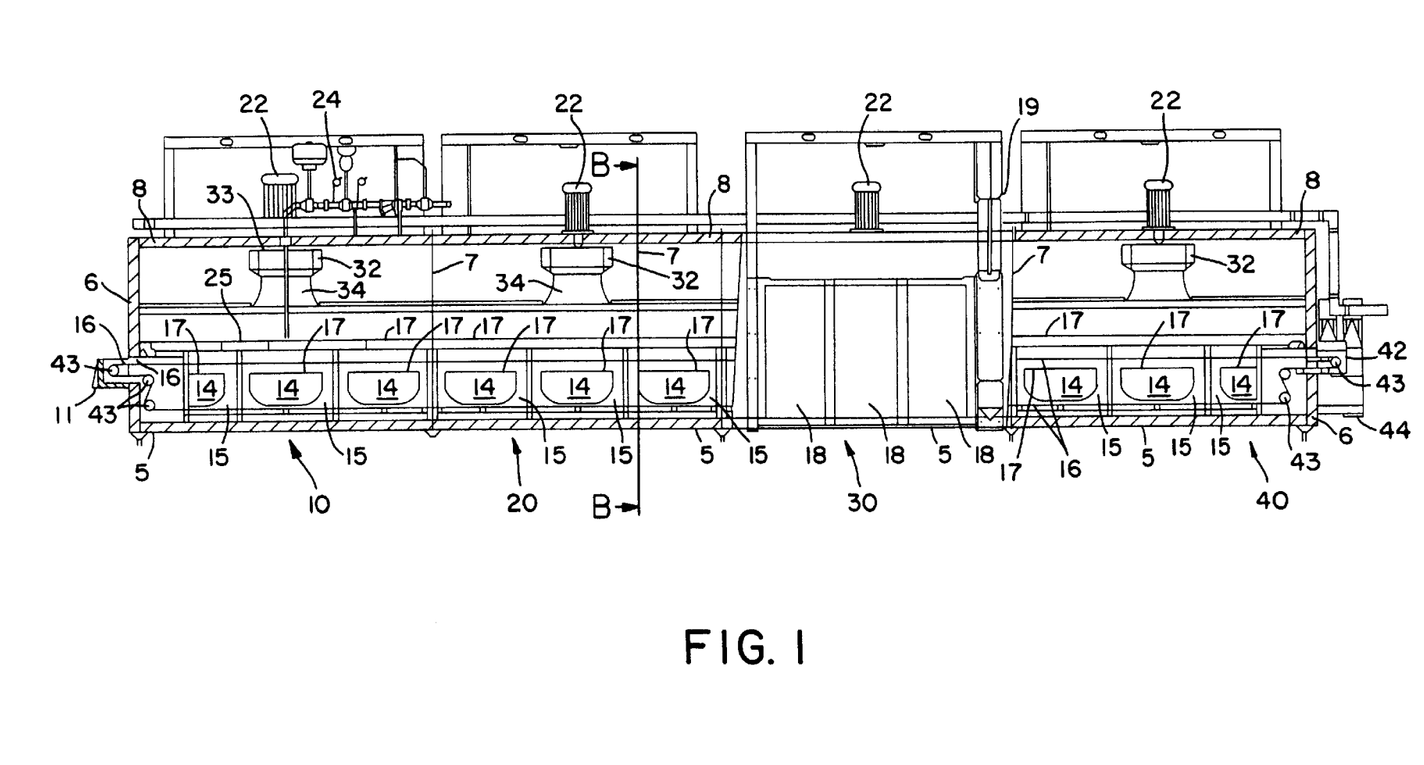
FIG. 1 is a longitudinal cross-sectional representation of a freezer according to the present invention.

With reference to FIG. 1 entrance module 10, intermediate modules 20 and 30 and exit module 40 define one embodiment of the freezer of the present invention. The modularity of the present invention enables a set of modules 10, 20, 30 and 40 to be arranged to meet specific freezing requirements for various food types. Entrance module 10 has liquid cryogen piping 24 and sprayer 25 which enable a stream of liquid cryogen to be sprayed into the jet of gaseous cryogen circulating within the module 10 and onto belt 16 and food items (not shown). Sprayer 25 should preferably comprise a plurality of full cone low flow rate spray nozzles. The use of sprayer 25 enables a rapid transfer of heat from the exterior of the food item resulting in rapid cooling and/or crust freezing of food items upon entering the series of modules and decreases dehydration of the food items. The sprayer 25 may be included in any other module if additional or continuous crust freezing is necessary or desirable.

Figure 2:
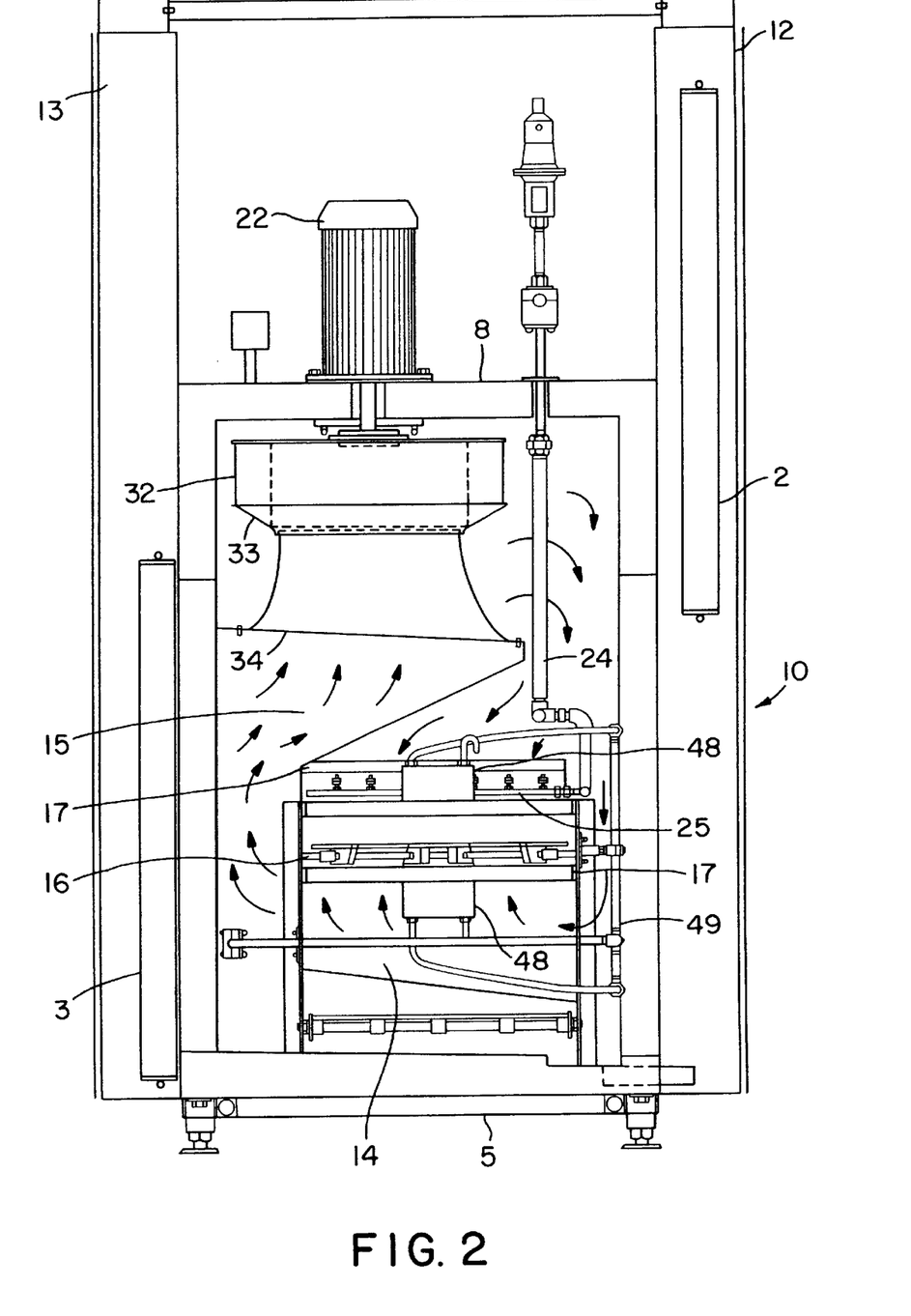
FIG. 2 is a plan view of the freezer of FIG. 1 as seen from the entrance end of FIG. 1 with the exterior wall and inlet removed.

Impeller 32 of module 10 is in fluid communication with intake cone 34 and generates a flow of cryogen out exit 33 by which it circulates a flow of cryogenic vapor around the interior of the module 10 in accordance with the flow patterns represented by arrows in FIG. 2. cryogenic vapor flows from exit 33 through impinger 17 past sprayer 25 entraining liquid cryogen into the stream and then impinging on food items on belt 16. A high pressure flow of cryogen enters high pressure plenums 14 and an impinger 17 (which comprises the top of high pressure plenum 14) and flows under and through belt 16 which provides impingement jets on the underside of the food items on belt 16. Belt 16 is a standard woven stainless steel belt typically used in food freezers. The flow of cryogenic vapor is returned to the intake cone 34 of impeller 32 through the low pressure plenum 15. Impeller 32 can be a 762 mm diameter centrifugal fan operating at 283 cubic meters per minute at 0.5 kpa static pressure having a 7.45 KW inverter driven motor or other type of blower having similar characteristics.

Piping 24 is connected to a supply of liquid cryogen (not shown) providing a conduit for a supply of liquid cryogen for sprayer 25 and to provide a source of cryogenic vapor for circulation within each freezer module.

Entrance module 10 is comprised of a top, bottom and four walls. In FIG. 1 wall 6 of module 10 is configured so as to include inlet 11. Bottom plate 5 and top plate 8 provide a top and bottom to entrance module 10 as well as the other modules 20, 30, and 40. At the right hand side of entrance module 10 is a divider baffle 7 on the high pressure side of impinger 17 which can be open and closed so as to control the amount of cryogenic vapor passing from one module to another as well as to control the amount of internal pressure within modules. The gas flow through the system can also be controlled using a sensor mounted on the plenum. This sensor will note the changes in the pressure of gas in the chamber and will communicate with the impeller to either increase or decrease the impeller speed and regulate gas flow through the system. This will also improve the overall efficiency of the system. In one embodiment the divider baffle 7 comprises one or more sliding doors which are manually opened and closed in order to control the transfer of cryogen between modules. In a further embodiment an controlled damper is used as the divider baffle 7. The final two walls of entrance module 10 are depicted in FIG. 2 as walls 2 and 3 which are sliding door mechanisms contained in framework 12 and 13 respectively and enable access to the interior of the apparatus.

Figure 3:
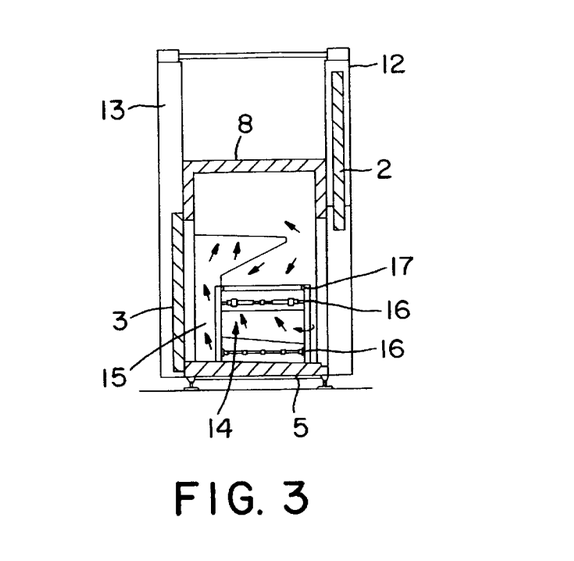
FIG. 3 is an axial cross-sectional representation of the freezer of FIG. 1 through line B—B.

Intermediate modules 20 and 30 are similar to module 10 in construction in that they contain a portion of belt 16 which conveys food items through the module. Intermediate module 20 is depicted in cross-section whereas intermediate module 30 is depicted so as to show the exterior doors 18 which can be raised for internal axis by use of counterweight 19. In intermediate module 20 or 30 an impeller 32 powered by motor 22 circulates cryogenic vapor according to the arrows shown in FIG. 3 which is a cross-section of intermediate module 20 taken through line B—B of FIG. 1. Bottom plate 5 and top plate 8 provide a top and bottom to the module. Top plate 8 is also where impeller 32 is mounted and connected to the drive shaft of motor 22. As in the other modules impingers 17 provide a means for increasing the velocity of the cryogenic gas to generate impingement jets prior to impingement of the gas on food items on belt 16. Food items pass from one module through an opening on the low-pressure side of impingers 17 which permits the belt 16 to pass continuously from one module to another.

A series of intermediate modules 20 and 30 can be used to provide for a certain length of freezing time depending on the belt speed or throughput of food items required and the amount of time such food items need to be in the cryogenic environment to reach a desired goal. The modularity of the freezer provides for any variation in these parameters.

Exit module 40 is similar to the other modules with the exception of the placement of an outlet 42 in side wall 6 and a series of rollers 43 for return of belt 16 through the modules. Exit module 40 also has an un-insulated plenum 44 attached to its exterior to catch gas which will fall upon exit from the module. In a further embodiment of the present invention, the freezer exhaust is divided into three sections. These separate sections are a central exhaust. The primary exhaust will remove 80% of the total cryogenic gas from the low pressure exit end of the freezer. The secondary exhausts each capture 10% of the cryogenic gas from the inlet and exit of the freezer. This allows for both a reduction in the infiltration of air but also creates co-current gas flow down the length of the freezer. The cryogenic gas can be exhausted at warmer temperatures which will increase the overall efficiency of the freezer unit. Reduced icing in the exhaust ducts will also result. Further, smaller diameter exhaust ducts and smaller exhaust blowers can be employed while reducing make-up air usage. The entrance end of exit module 40 is similar to the entrance end of intermediate modules 20 and 30 in that a module divider baffle 7 provides for control of the transfer of cryogen between modules. Likewise impeller 32 circulates a stream of cryogenic gas through the high pressure plenum 14 and impingers 17 and onto the food items. A sprayer 25 and supporting piping 24 could be added to the exit module 40 if additional crust freezing is necessary.

Figure 5:
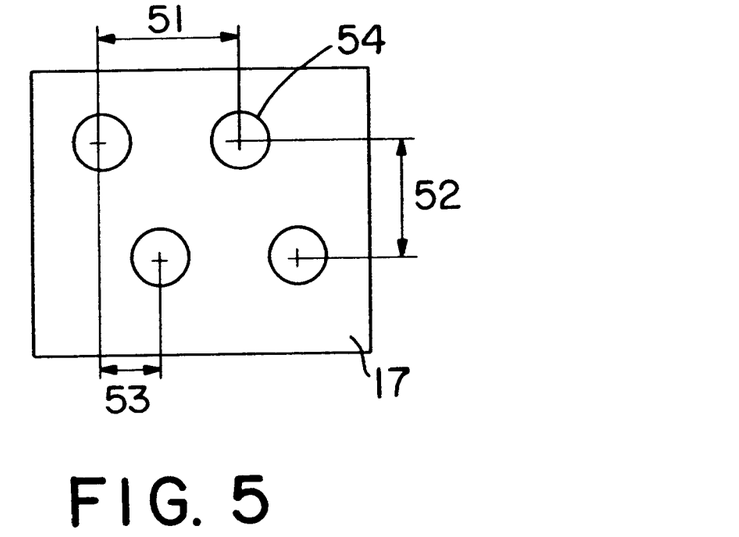
FIG. 5 is top plan view of a portion of an impingement plate having holes for use in a freezer according to the present invention.
Figure 9:
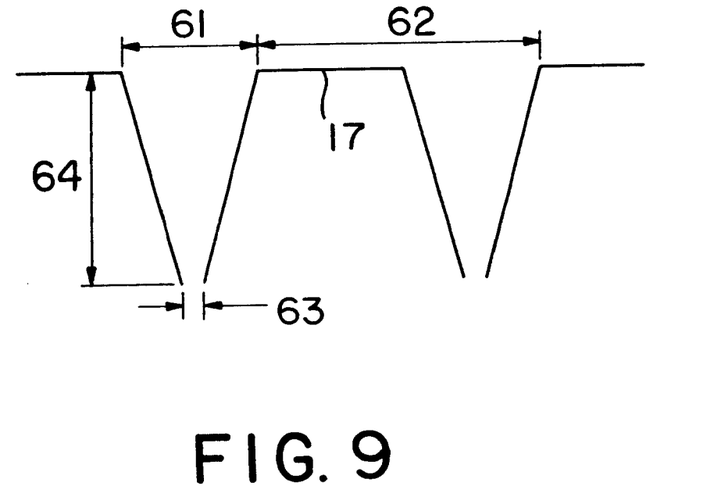
FIG. 9 is a cross-sectional view of channel impingement device for use in a freezer according to the present invention.

A important feature of the present invention is the design of the impinger 17 which could be an impingement plate a potion of which is depicted in FIG. 5 or a series of sheet metal channels as depicted in FIG. 9. Depending on the configuration of the module the size of the plate may vary, however, the total open area of the impinger, i.e., the area of the holes should be between approximately 3% and 6% of the total area of the impinger. The most preferred percentage of open area is 4–5%. In the preferred embodiment of FIG. 5 the axial pitch 51 and lateral pitch 52 are both 1⅞ inches when the hole diameter 54 is ½ inch. Also, offset or stagger 53 of the center of the holes should be approximately ⅝ inch in the preferred embodiment. The reason for the offset or stagger is that it has been found to provide an even chill or freeze of product across the width of the belt thereby reducing or eliminating impingement lines on the food items. The plate version of impinger 17 is fabricated from 22 gauge steel in the preferred embodiment. The holes in plate version of impinger 17 are radiused at 15%.

Figure 6:
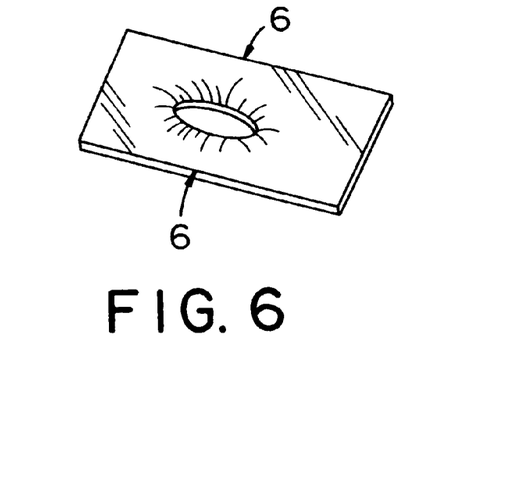
FIGS. 6 and 7 are top and bottom perspective views of a portion of the impingement plate having holes for use in a freezer according to the present invention.
Figure 7:
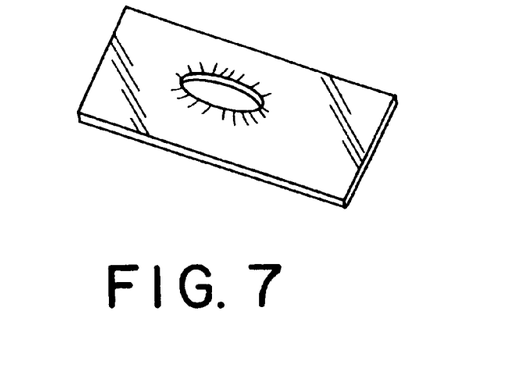
Figure 8:
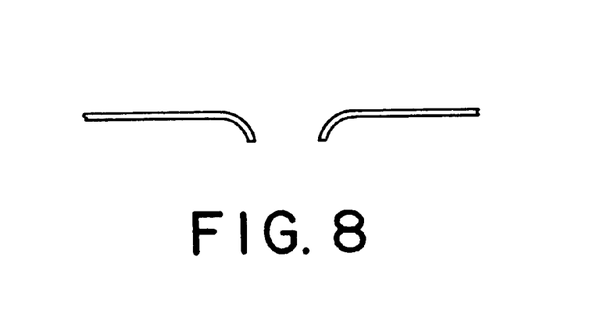
FIG. 8 is a cross-sectional view of a portion of the impingement plate of FIGS. 6 and 7 through line 6—6.

FIGS. 6 and 7 show the rounded edges of the holes in impinger 17. FIG. 8 depicts a cross-sectional view of impinger 17 through section lines 6—6. This design reduces or prevents ice-build-up inside the hole and produces an impingement jet which has a velocity profile which is more effective in chilling or freezing the food item.

Figure 4:
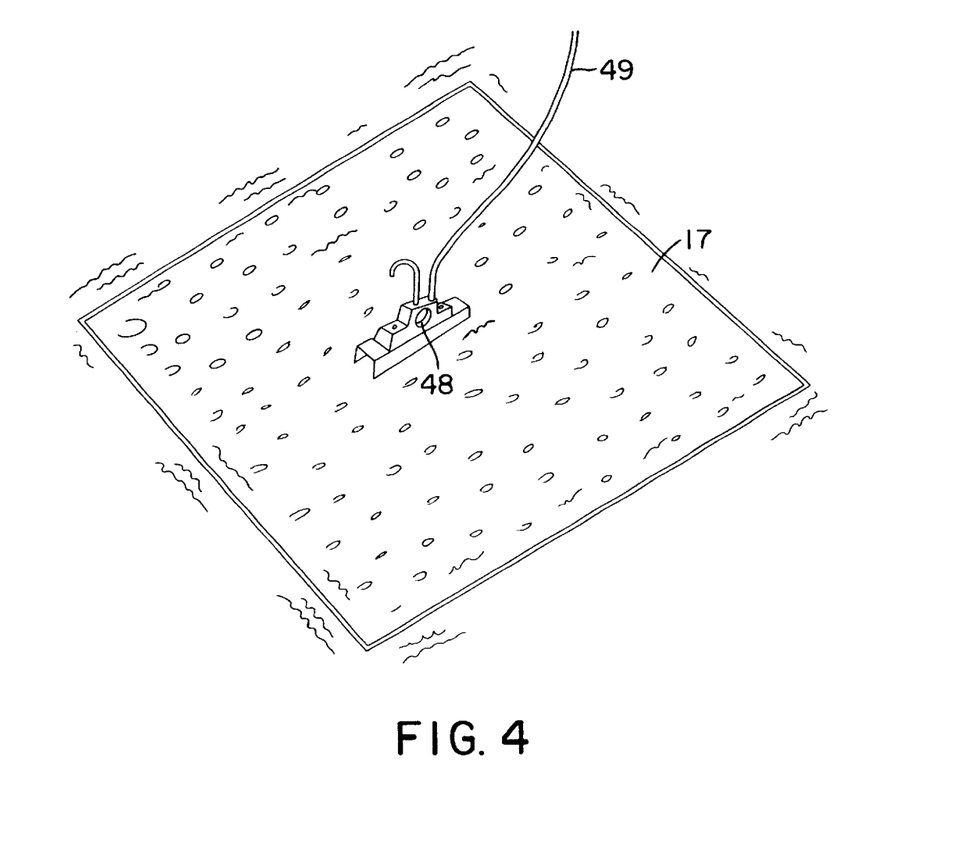
FIG. 4 is a perspective view of an impingement plate and the pneumatically actuated ball valve vibrator.

FIG. 4 depicts an impinger 17 of the plate type as described above. Each impinger 17 needs to have a vibrator 48 which vibrates impinger 17 which is preferably free-floating in a rigid frame. Vibrator 48 may be of the electrical variety, however, in the preferred embodiment vibrator 48 is a ball valve pneumatically actuated by compressed nitrogen gas supplied through conduits 49 at or about 60 psi from either an external source or from a vaporizer and compressor (not shown) internal to the apparatus. The frequency and time intervals at which vibrator 48 is used to vibrate impingers 17 is dependent on process conditions including the moisture content of the food items, the humidity of the ambient air in and around the apparatus and the temperature of the module.

FIG. 9 depicts the cross section of an impinger 17 which comprises a series of channels fabricated from a sheet of metal. In the preferred embodiment channel width 61 should be approximately 3 inches, channel pitch 62 should be approximately 12 inches, channel depth should be approximately 14 inches and channel opening 63 should be approximately ⅝ inch.

The distance from the impinger 17 to the product surface should be approximately 3 inches but could vary from approximately 1 inch to approximately 5 inches. The position and spacing of holes or vortices in impinger 17 effects the total overall heat transfer rate.

Through the connection of a series of modules total product coverage along the entire length of the freezer (continuous heat transfer area with no breaks) maximizes the overall heat transfer rate. Typical freezing temperatures for an apparatus according to present invention are −120 C. in entrance module 10 and −50 C. at exit module 40. In the referred embodiment four modules are employed each being 3.048 meters long, 1.753 meters wide and 3.150 meters tall. The belt width in the preferred embodiment is 0.712 meter. Modules of various sizes may be constructed according to the present invention.

The impellers 32 may also be mounted on the side in order to reduce the height of the apparatus. In a lower profile embodiment a plurality of impellers 32 are mounted either on the side or on the top. Using a plurality of lower height impellers 32 enables an overall height reduction in the design.

Figure 10:
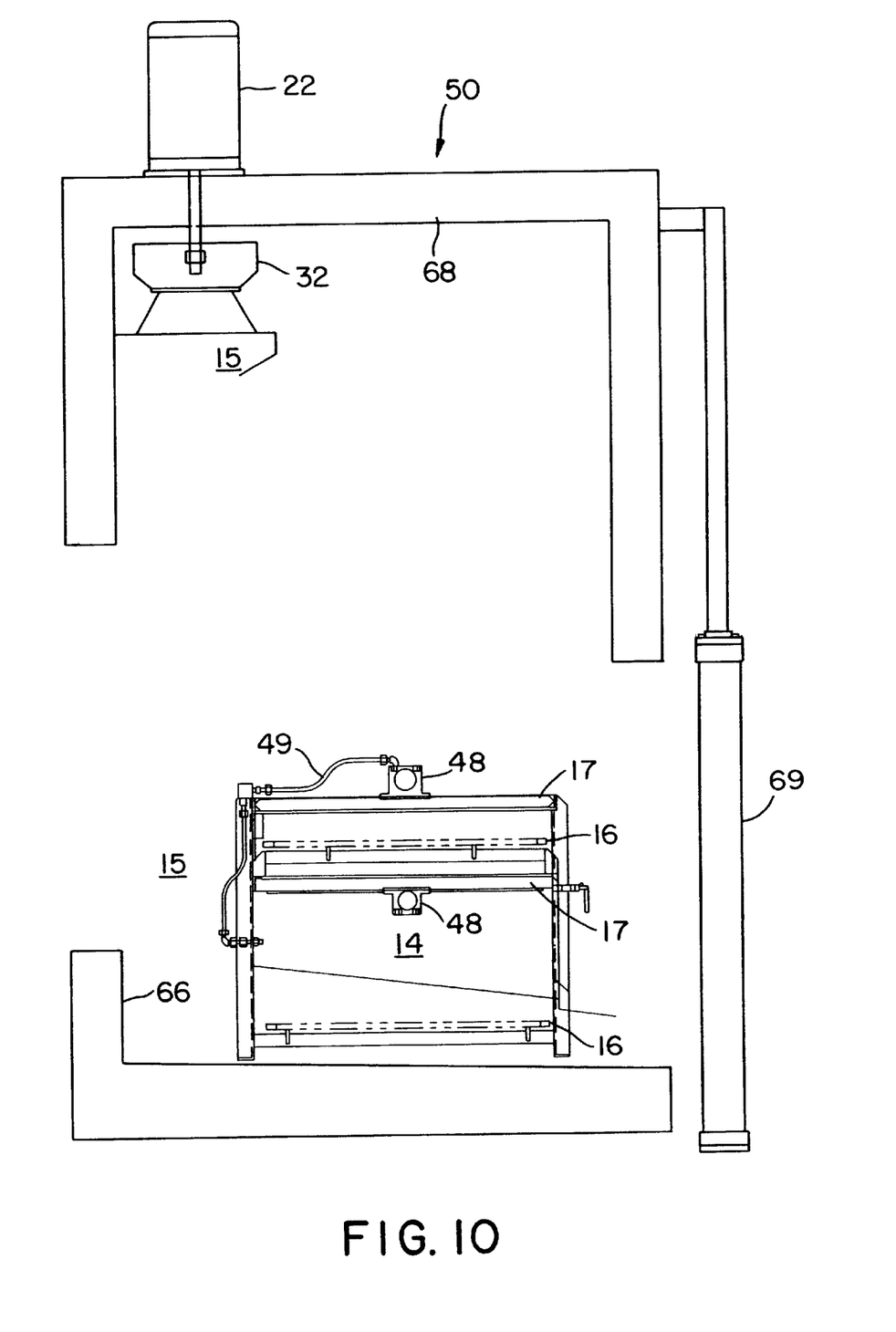
FIG. 10 is a cross-sectional view of an additional embodiment of an intermediate module of the present invention.

FIG. 10 is a cross-sectional representation of an additional embodiment of the present invention. An intermediate module 50 is shown which is comprised of two portions. Top portion 68 and bottom portion 66 together create an enclosure. Motor 22 is mounted through top portion 68 where it connects with and drives impeller 32. Belt 16, impingers 17, vibrator 48 and conduits 49. The use of the two piece construction of module 50 enables the use of a hydraulic lift 69 to raise and lower top portion 68 in order to enable cleaning of the internal components of the apparatus and to enable servicing of internal components.

The present invention is preferably operated with liquid nitrogen, however, other cryogens may also be employed such as synthetic liquid air (SLA) and carbon dioxide.

In the standard operation of the present invention liquid cryogen is sprayed into the entrance module of the apparatus upon start-up. As the liquid cryogen impinges on the impingers 17 and the belt 16 a portion will vaporize. The vaporized liquid cryogen is then circulated by the impeller 32 from the low pressure plenum 15 to the high pressure plenum 14 wherein it is forced through the holes or channels in impinger 17 thereby creating the impingement jets. The impingement jets then continue to entrain additional liquid cryogen which is sprayed from sprayer 25. All of the vaporized cryogen will pass from the entrance module to the intermediate or exit module through the low pressure side of the impingers, i.e., through the hole which permits the belt 16 and food items to pass from one module to another. The majority of the vaporized cryogen, however, is passed from one module to another through the divider baffle 7 which enables the use to control the amount passed.

While various embodiments of the present invention have been described in detail, it is apparent that further modifications and adaptations of the invention will occur to those skilled in the art. However, it is to be expressly understood that such modifications and adaptations are within the spirit and scope of the present invention.

We claim:

1. An apparatus for cooling or freezing food items comprising:
   an entrance module having a top, bottom and four walls comprising:
      an inlet through a first wall for introducing food items into the entrance module;
      a belt for conveying the food items from the inlet through the entrance module;
      an impeller for circulating vaporized liquid cryogen above and below the belt;
      an impinger capable of directing said circulated vaporized cryogen into a plurality of impingement jets in the vicinity of the food items; and,
      a sprayer for providing at least one stream of liquid cryogen into the impingement jets;
   and an exit module having a top, bottom and four walls comprising:
      a belt for conveying the food items conveyed through the entrance module through the exit module;
      a divider baffle for conveying at least a portion of the vaporized cryogen from the entrance module;
      an impeller for circulating said vaporized cryogen above and below the belt;
      an impinger capable of directing said circulated vaporized cryogen into a plurality of impingement jets in the vicinity of the food items; and,
      an outlet capable of allowing cooled or frozen food items to exit the exit module.

2. The apparatus of claim 1 further comprising an intermediate module capable of being connected between said entrance module and said exit module comprising:
   a belt for conveying the food items from the entrance module through the intermediate module to the exit module;
   a divider baffle for conveying at least a portion of the vaporized cryogen from the entrance module to the intermediate module;
   an impeller for circulating said vaporized cryogen above and below the belt; and,
   an impinger capable of directing said circulated vaporized cryogen into a plurality of impingement jets in the vicinity of the food items.

3. The apparatus of claim 2 wherein at least one of the intermediate module or the exit module comprises a sprayer for spraying one or more streams of liquid or solid cryogen into said impingement jets.

4. The apparatus of claim 1 wherein the module divider baffle is at least one sliding door.

5. The apparatus of claim 1 wherein the module divider baffle is an electromechanically controlled damper.

6. The apparatus of claim 1 wherein each module further comprises at least one high pressure plenum wherein the vaporized cryogen is circulated by the impeller prior to entering the impinger.

7. The apparatus of claim 6 wherein a pressure sensor is mounted on said at least one high pressure plenum.

8. The apparatus of claim 7 wherein said pressure sensor is in communication with said impeller to increase or decrease the speed of said impeller.

9. The apparatus of claim 1 wherein each module further comprises at least one low pressure plenum wherein the vaporized cryogen is collected upon exiting the impingers and through which the vaporized cryogen is recirculated to the impeller.

10. The apparatus of claim 1 wherein the impingers are plates having a plurality of holes therethrough.

11. The apparatus of claim 10 wherein the edges of the holes are chamfered or rounded.

12. The apparatus of claim 11 wherein the holes are rounded to 15 percent.

13. The apparatus of claim 10 wherein the total area of said holes comprises between approximately 3% and approximately 6% of the total area of the plate.

14. The apparatus of claim 10 wherein the total area of said holes comprises between approximately 4% and approximately 5% of the total area of the plate.

15. The apparatus of claim 1 further comprising a vibrator for vibrating each impinger to reduce or remove the accumulation of snow or ice on the impinger.

16. The apparatus of claim 13 wherein the vibrator is electrically driven.

17. The apparatus of claim 15 wherein the vibrator is a pneumatically driven ball valve.

18. The apparatus of claim 17 wherein the bail valve is pneumatically driven by compressed nitrogen.

19. The apparatus of claim 18 wherein the nitrogen is compressed to approximately 60 psi.

20. The apparatus of claim 1 further wherein at least two walls of each module are comprised of at least two portions so as to permit the top portions to be raised and lowered along with the top of the module.

21. The apparatus of claim 20 wherein the top portions of the at least two walls and the top are raised and lowered using a hydraulic lift.

22. The apparatus of claim 1 wherein each impinger is approximately 3 inches from said food items.

23. The apparatus of claim 3 wherein said exit module further comprises an exhaust line.

24. The apparatus of claim 23 wherein said exhaust line is divided into three sections.

25. The apparatus of claim 24 wherein said three sections comprise one central section and two secondary sections.

26. The apparatus of claim 25 wherein said central section removes 80% of total gases from said module.

27. A method of cooling or freezing food items comprising the steps of:
   introducing food items into a plurality of attached modular enclosures each having a belt;
   spraying liquid cryogen in at least one enclosure near the food items;
   circulating vaporized liquid cryogen from a low pressure area to create a high pressure area above and below the belt in each enclosure;
   directing pressurized vaporized liquid cryogen through an impinger to generate impingement jets in each enclosure;
   impinging the food items with said impingement jets in each enclosure;
   recirculating the vaporized liquid cryogen to the low pressure area in each enclosure.

28. The method of claim 27 further comprising:
   vibrating said impingers at periodic intervals to remove the build-up of snow or ice.

29. The method of claim 28 further comprising:
   vaporizing liquid nitrogen to produce nitrogen gas;
   compressing said nitrogen gas to produce pressurized nitrogen gas;
   actuating a ball valve using said pressurized nitrogen gas thereby causing vibration in said impingers.

* * * * *